US010601941B1

(12) United States Patent
Postelnik et al.

(10) Patent No.: US 10,601,941 B1
(45) Date of Patent: Mar. 24, 2020

(54) METHOD AND APPARATUS FOR OPTIMIZATION OF ADVERTISEMENT ELEMENTS IN NETWORK RESOURCES

(71) Applicant: CLOUDFLARE, INC., San Francisco, CA (US)

(72) Inventors: Igor Postelnik, San Francisco, CA (US); John Fawcett, San Francisco, CA (US); Dane Orion Knecht, San Francisco, CA (US); Oliver Zi-gang Yu, San Francisco, CA (US); Dani Grant, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/203,444

(22) Filed: Nov. 28, 2018

(51) Int. Cl.
*G06F 15/173* (2006.01)
*H04L 29/08* (2006.01)
*G06Q 30/02* (2012.01)
*H04L 29/06* (2006.01)

(52) U.S. Cl.
CPC ..... *H04L 67/2828* (2013.01); *G06Q 30/0277* (2013.01); *H04L 67/32* (2013.01); *H04L 69/04* (2013.01)

(58) Field of Classification Search
CPC ..... H04L 67/2828; H04L 67/32; H04L 69/04; G06Q 30/0277
See application file for complete search history.

(56) References Cited

U.S. PATENT DOCUMENTS

| 2009/0276488 | A1* | 11/2009 | Alstad | H04L 67/303 |
| | | | | 709/203 |
| 2011/0282997 | A1* | 11/2011 | Prince | G06F 16/958 |
| | | | | 709/226 |
| 2013/0051690 | A1* | 2/2013 | Kuettel | G06F 17/214 |
| | | | | 382/232 |

FOREIGN PATENT DOCUMENTS

CA        2855420 A1 *  1/2015  ............. H04L 67/02

OTHER PUBLICATIONS

Sehati et al, "WebPro: A proxy-based approach for low latency web browsing on mobile devices" Jun. 15-16, 2015, 2015 IEEE 23rd International Symposium on Quality of Service (IWQoS) (Year: 2015).*

(Continued)

*Primary Examiner* — Ryan J Jakovac
(74) *Attorney, Agent, or Firm* — Nicholson De Vos Webster & Elliott LLP

(57) ABSTRACT

A method and system for optimization of an advertisement in a network resource in a proxy server of a cloud-based proxy service are described. Responsive to determining that there is an advertisement element in a network resource, the proxy server automatically modifies the advertisement element. The automatic modification of the advertisement element includes: 1) compressing style code into compressed style code; 2) compressing the image; and 3) compressing the style generation code. The proxy server generates a modified version of the network resource including the modified version of the advertisement element, where the modified version of the advertisement element is smaller in size than the advertisement element included in the network resource retrieved from the origin server; and transmits the modified version of the network resource to the client device instead of the network resource.

21 Claims, 7 Drawing Sheets

(56) References Cited

OTHER PUBLICATIONS

Gulhane et al, "A New Prototype of XML Compression Technique", Jun. 2012, International Journal of Emerging Technology and Advanced Engineering (Year: 2012).*

Akamai Technologies, "Front End Performance Testing & Optimization—How long are users waiting for your site to load?," Front End Optimization, downloaded from: https://www.akamai.com/usien/resources/front-end-optimization-feo.jsp on Sep. 5, 2018, 5 pages.

Graham K., "Optimize Ad and Page Loading Time," MonetizeMore, Nov. 24, 2016, downloaded from: https://www.monetizemore.com/blog/optimize-ad-page-loading-time/ on Sep. 5, 2018, 4 pages.

Techwelkin, "How to make Google Ads Load Faster?," downloaded from: https://techwelkin.com/load-google-ads-faster on Sep. 5, 2018, 13 pages.

* cited by examiner

REPLACE THE IMAGE WITH THE COMPRESSED IMAGE IN THE MODIFIED ADVERTISEMENT ELEMENT
318

REPLACING THE IMAGE WITH AN ENCODED STRING OF THE IMAGE IN THE ADVERTISEMENT ELEMENT
502

THE ENCODED STRING OF THE IMAGE IS A DATA-UNIFORM RESOURCE IDENTIFIER (URI)
504

REPLACE THE IMAGE WITH AN OPTIMIZED IMAGE THAT IS OF SMALLER SIZE
506

FIG. 5

METHOD AND APPARATUS FOR OPTIMIZATION OF ADVERTISEMENT ELEMENTS IN NETWORK RESOURCES

FIELD

Embodiments of the invention relate to the field of network services; and more specifically to a method and system for optimization of advertisement elements in network resources.

BACKGROUND

Today's web consumers expect network resources to load at increasing speeds. Web consumers may abandon the network resource if the network resource takes more than few seconds to load resulting in significant loss of revenue for the owner of the network resources.

Network resource performance optimization is key to the success of modern online businesses. Further advertisement elements included in the network resources add a significant weight to the network resource. The advertisement elements included in a network resource may originate from various sources and may be of varying sizes significantly slowing down the loading of the network resources at the client's side.

BRIEF DESCRIPTION OF THE DRAWINGS

The invention may best be understood by referring to the following description and accompanying drawings that are used to illustrate embodiments of the invention. In the drawings:

FIG. 5 illustrates a flow diagram of exemplary operations for replacing an image with a compressed image in the modified advertisement element, in accordance with some embodiments.

DESCRIPTION OF EMBODIMENTS

Figure 1A:
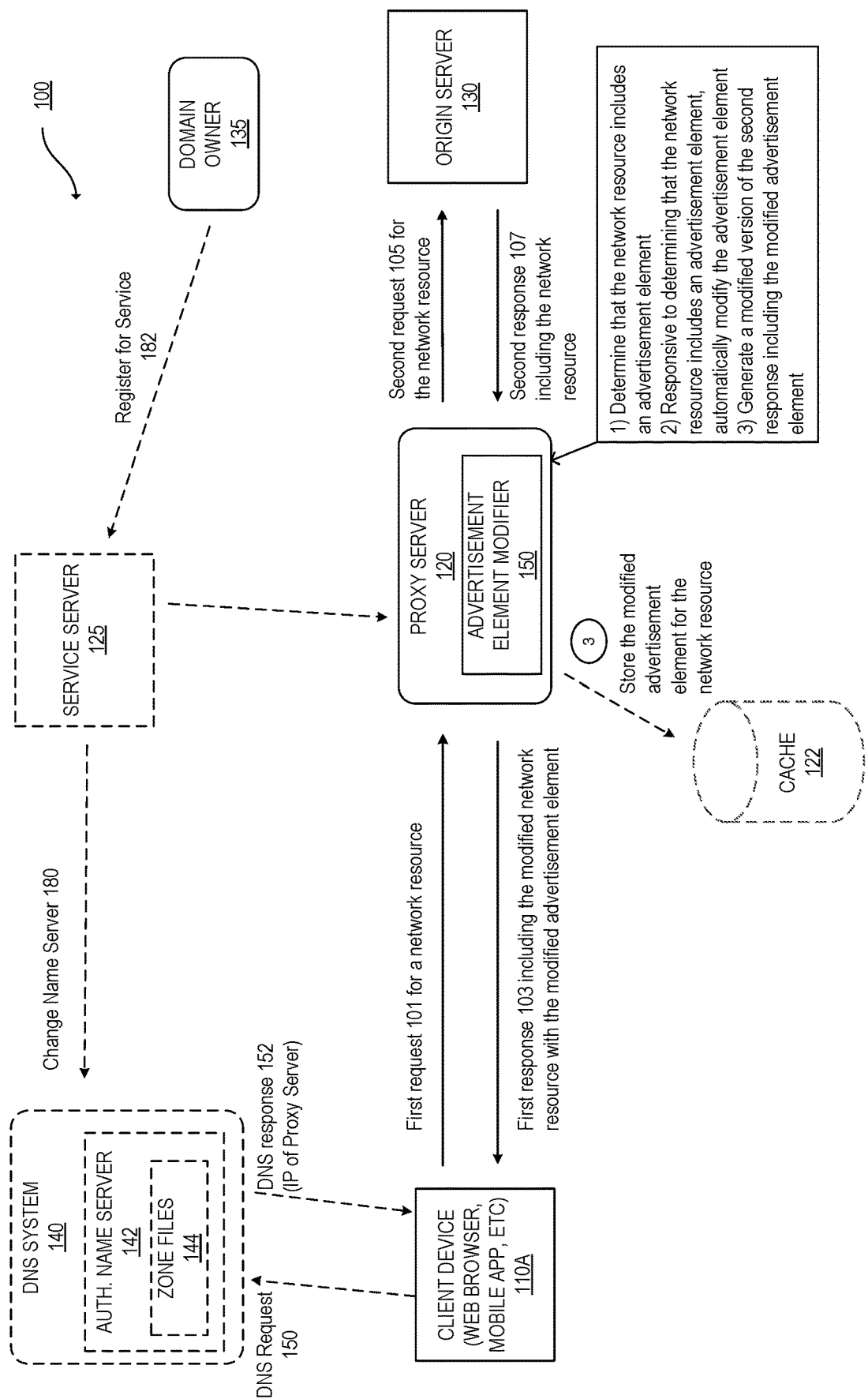
FIG. 1A illustrates a block diagram of an exemplary architecture for enabling optimization of advertisement elements in network resources, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The embodiments described herein provide a method and system for optimization of an advertisement in a network resource in a proxy server of a cloud-based proxy service. The solutions presented herein allows the reduction of the weight of an advertisement element on the fly by a proxy service. The reduction of the weight of the advertisement element is performed by optimizing the network resource at the markup language layer (e.g., Hypertext Markup Language (HTML)) and optimizing the associated resources and elements included or referred in the network resource. The advertisement element optimization mechanism is performed inline as part of processing performed in a proxy server receiving requests on behalf of an origin server hosting the network resource. As opposed to conventional methods where the origin server may perform some optimization on an advertisement element by modifying the network resource at the application layer, the present mechanisms allow the optimization to be performed on the fly without requiring the intervention of the origin server, which significantly simplifies this operation for the owner/administrator of the origin server. Further, Advertisement elements are created by multiple entities and are delivered by different sources such that the origin server may be required to perform different processing depending on the source and the type of advertisement element. Being able to reduce the weight of the advertisement element on the fly at the proxy server is valuable as it increases performance of the network resource when loaded at a client device without causing a processing burden on the origin server hosting the resource. Further the proxy server can adapt the reduction of the size to the type of element.

A method and system for optimization of an advertisement in a network resource in a proxy server of a cloud-based proxy service are described. In one embodiment, a request for a network resource is received from a client device. The proxy server retrieves from the origin server the network resource. The proxy server determines whether there is an advertisement element in the network resource.

Responsive to determining that there is an advertisement element in the network resource, the proxy server automatically modifies the advertisement element. The automatic modification of the advertisement element is performed by: 1) responsive to determining that the advertisement element includes style code, performing the following: compressing the style code into compressed style code, and replacing the style code with the compressed style code in the advertisement element to generate a modified advertisement element; 2) responsive to determining that the advertisement element includes an image, performing the following: compressing the image, and replacing the image with the compressed image in the modified advertisement element; 3) responsive to determining that the advertisement element includes style generation code, performing the following: compressing the style generation code, and replacing the style generation code with the compressed style generation code in the modified advertisement element. The proxy server generates a modified version of the network resource including the modified version of the advertisement element, where the modified version of the advertisement element is smaller in size than the advertisement element included in the network resource retrieved from the origin server; and transmits the modified version of the network resource to the client device instead of the network resource.

FIG. 1A illustrates a block diagram of an exemplary architecture for optimization of advertisement element in according to one embodiment. The architecture 100 includes a client device 110, a proxy server 120, an origin server 130, a domain owner 135 and optional components such as service server 125 and DNS system 140.

The client device 110 is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources hosted on a server. The client device 110 is operative to transmit a request for a network resource that is hosted on the origin server 130. While a single client device is illustrated, any number of client devices can be in communication with the proxy server 120.

The proxy server 120 is a computing device coupled with the client device through a network (not illustrated). The proxy server 120 is part of a cloud-based proxy service which provides different services for customers (e.g., the domain owner 135). The proxy server 120 is situated between client devices (e.g., client device 110) and the origin server 130. In one embodiment, the proxy server 120 is a reverse proxy server. Certain network traffic is received and processed through the proxy server 120. For example, web traffic (e.g., HTTP requests/responses, HTTPS requests/responses, SPDY requests/responses, etc.) for domains of the origin server 130 may be received and processed at the proxy server 120. In one embodiment, the domain owner 135 are customers of the cloud-based proxy service. The owner of the proxy server 120 is typically different than the owner of the origin server 130. In addition, the proxy server 120 is not typically part of the local network of the origin server 130. For example, the proxy server 120 is outside of the local area network of the origin server 130 and is typically not physically accessible by the owner/administrator of the origin server 130.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a mechanism for optimization and modification of advertisement elements includes in network resources hosted at the origin server, as it will be described in further details below.

Generally speaking, the proxy server 120 receives certain network traffic from the client device 110 requesting Internet resources. For example, the proxy server 120 may receive requests for an action to be performed on an identified resource (e.g., an HTTP GET request, an HTTP POST request, other HTTP request methods, or other requests to be applied to an identified resource on an origin server) from the client device 110. The request received from the client device 110 is destined for an origin server (e.g., origin server 130).

The proxy server 120 analyzes incoming traffic and takes one or more actions on the incoming traffic. The proxy server 120 causes the incoming traffic to be fulfilled. In some embodiments, the proxy server 120 may transmit the outgoing traffic to the appropriate origin server 130. For example, the proxy server may receive a first request 101 for a network resource and may transmit the request 103 (e.g., an HTTP GET request) for the network resource to the origin server 130. The origin server 130 may transmit a response 107 (e.g., an HTTP response) with the requested resource to the proxy server 120. The proxy server 120 may analyze the incoming traffic including the response and take one or more actions, including, for example, transmitting the response to the requesting client device 110. The proxy server 120 determines whether the response 107 includes or refers one or more advertisement elements and modifies at least one of the advertisement elements prior to transmitting the response 103 to the client device 110. The response 103 includes a modified network resource including a modified advertisement element. The proxy server 120 may also cache resources for the domains and respond to requests from client devices locally if the requested resource is in cache (e.g., stored in cache 122). For example, when the proxy server 120 is to send a modified network resource with a modified advertisement element, it may first determine whether the modified advertisement element is already present in the cache or that the network resource with the modified advertisement element is present in the cache and may transmit the modified network resource with the modified advertisement element to the client device after being retrieved from the cache 122.

In some embodiments, incoming traffic is received at a particular server 120 as a result of a DNS request 150 for a domain of one of the domain owners 135 resolving 152 to an IP address of the proxy server 120. By way of example, DNS record(s) for the domain "example.com" may resolve to an IP address of a server 120. In some embodiments, multiple domains that may be owned by different domain owners may resolve to the same server 120 (e.g., the same IP address or a different IP address of the proxy server 120).

For example, the domain owner 135 owns one or more domains (e.g., example.com) for which the proxy server 120 may receive requests. The proxy server 120 may receive requests for the resources at a given location of the domain (e.g., example.com/login).

The origin server 130 is an electronic device that serves and/or generates network resources (e.g., web pages, images, word processing documents, PDF files movie files, music files, or other computer files). For example, the origin sever 130 may host the domain of the domain owner 135 (e.g., example.com) and is operative to respond to requests for resources at that domain. Although not illustrated in FIG. 1A and FIG. 1B, it should be understood that the network resources of the origin servers may be stored separately from the device that responds to the requests.

In some embodiments, the domain owner 135 is a customer of a cloud-based service and registers their respective domain for the service (operation 182). For example, the authoritative name servers for each domain of the domain owner 135 may be changed to the authoritative name server 142 of the service at operation 180. It should be understood that the backup authoritative name server serving the domain may also be changed to an authoritative name server of the service. The zone file record for the domain is also changed (in the zone files 144) such that DNS resolution requests for the domain owned by the domain owner 135, which corresponds with the origin server 130, resolve to the proxy server 120. In one embodiment, a customer (e.g., the domain owners 135 or other entity (e.g., web administrators) on behalf of the domain owner 135) may use the service server 125 to change their authoritative name server to the authoritative name server 142 and change their zone file to have their domain point to the proxy server 120. In some embodiments, the domain owner 135 or an administrator of the domain can input through a graphical interface.

The service server 125 is an electronic device operated by the cloud-based proxy service, which provides a set of tools and interfaces for the domain owner 135 and is accessible over the Internet. For example, the service server 125, among other things, allows the domain owner 135 to register for the service, view statistics/logs of events, and report suspicious events. The service server 125 includes tools to assist the domain owner 135 in changing their authoritative name servers and zone file record. It should be understood, however, that the domain owner 135 may change their authoritative name server and zone file without use of the service server 125 (i.e., they may directly change the authoritative name server and zone file). The service server 125 includes tools to assist the domain owner 135 to select a set of services offered by the cloud-based proxy service.

The DNS system 140 is used to refer to the DNS system as a whole and includes multiple DNS servers to resolve DNS requests. As illustrated, the DNS system 140 includes the authoritative name server 142, which is an authoritative name server for the service. Thus, the authoritative name server 142 is the authoritative name server for the domains corresponding to the origin server 130. Accordingly, when the DNS system 140 resolves a request for a domain corresponding to the origin server 130, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

While FIG. 1A illustrates a single proxy server 120, in some embodiments the cloud -proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates a single origin server 130 and a single client device 110 respectively coupled with the proxy server 120, in some embodiments the server is coupled with multiple origin servers and/or with multiple client devices. Moreover, in some embodiments, there are multiple proxy servers providing service for a particular domain.

In some embodiments, the client device 110A makes an initial request 101 for a resource at the origin server 130 (e.g., an HTTP GET request, or other request), which is transmitted to the proxy server 120. The proxy server 120 analyzes the initial request 101 and transmits the request to the origin server as a second request 105. The origin server 130 transmits a second response 107 to the proxy server. The second response 107 includes the requested network resource. The proxy server receives the response 107 and analyzes it. The proxy server determines, at operation 1, that the network resource includes an advertisement element. In some embodiments, the advertisement element may include code embedded in the body of the network resource. Alternatively or additionally, the advertisement element may include a link to a location where the advertisement element is stored. In an exemplary embodiment, the network resource may include elements that act as placeholders for an advertisement element. These elements include scripts that query a server including the advertisement element and download the actual advertisement element to be served for the network resource.

Upon determining that the network resource includes an advertisement element, the proxy server 120 automatically modifies, at operation 2, the advertisement element prior to transmitting a response to the client device 110A. At operation 3, The proxy server 120 generates a modified version of the second response 107. The modified version includes the modified advertisement element and is transmitted in the first response 103 to the client device 110A. The first response includes a modified network resource with a modified advertisement element.

In some embodiments, in addition to transmitting the response 103, the proxy server 120 stores in a cache 122 the modified advertisement element for the network resource. In some embodiments, the proxy server 120 may store the entire modified network resource with the modified advertisement element. In alternative embodiments, the proxy server stores only the modified advertisement element.

Figure 1B:
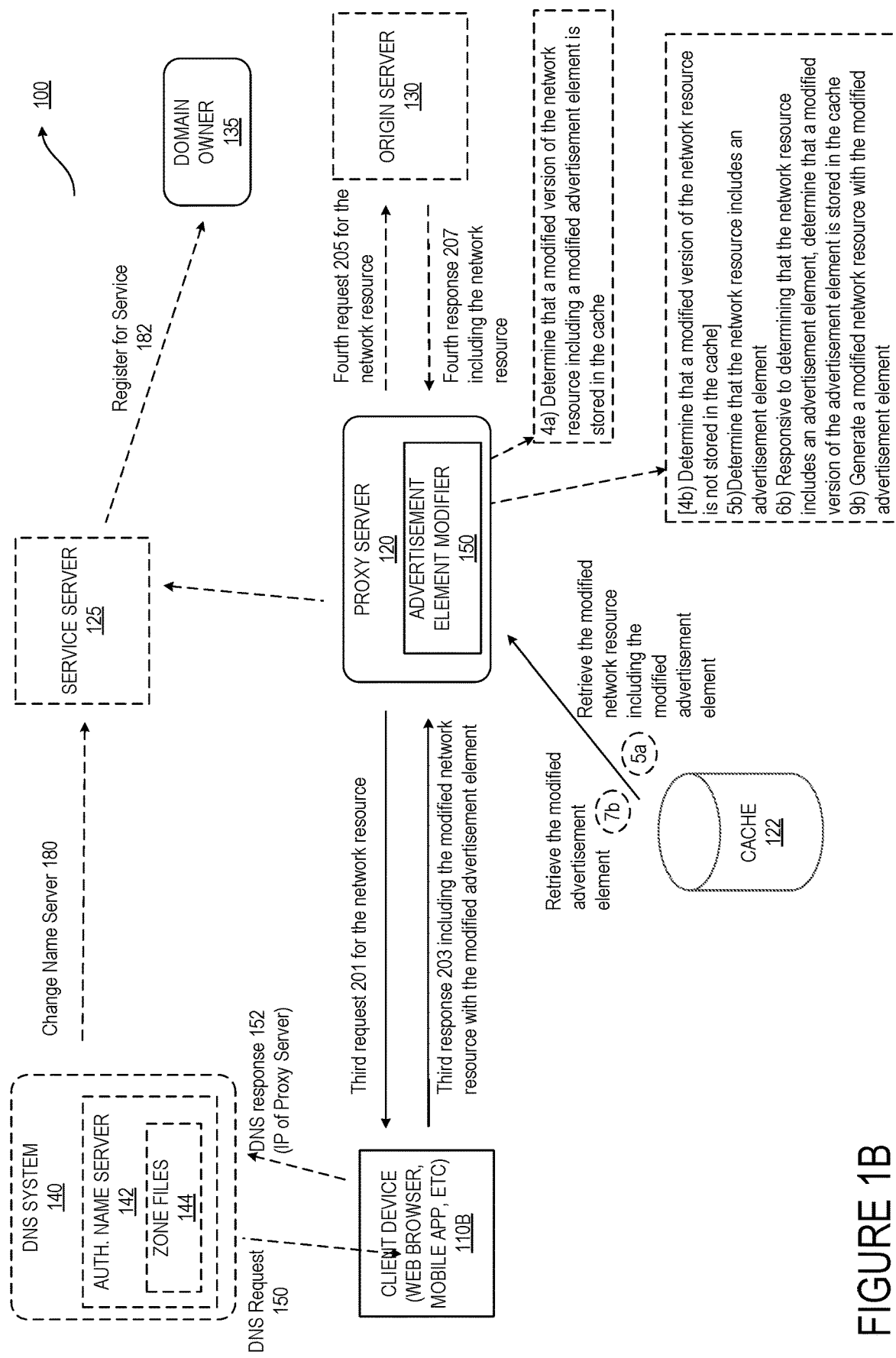
FIG. 1B illustrates a block diagram for optimization of a network resource when the advertisement element has been previously modified and stored in a cache, in accordance with some embodiments.

FIG. 1B illustrates a block diagram of the exemplary architecture 100 for optimization of a network resource when the advertisement element has been previously modified and stored in a cache, in accordance with some embodiments. The operations described in FIG. 1B occur following the operations described in FIG. 1A. The client device 110B, which is an electronic device, transmits a request 201 for the network resource, which is received by the proxy server 120. In some embodiments, the client device 110B can be the same as client device 110A making the request for the same resource at a different time. In other embodiments, the client device 110B is different from client device 110A and is requesting the same network resource that was requested at a previous time by client device 110A.

The client device 110B makes a request 201 for the network resource at the origin server 130 (e.g., an HTTP GET request, or other request), which is transmitted to the proxy server 120. In one embodiment, the proxy server 120 analyzes the request and determines at operation 4a that a version of the network resource is stored in the cache 122. The version stored in the cache 122 includes at least one modified advertisement element. For example, the modified version of the network resource may have been stored in the cache 122 after the operations described with reference to FIG. 1A occurred. In this embodiment, the proxy server 120 retrieves, at operation 5a, the modified network resource including the modified advertisement element from the cache 122 and transmits a third response 203 to the client device 110B. The third response includes the modified network resource with the modified advertisement element.

Alternatively, in a second embodiment, the proxy server 120 analyzes the request 201 and transmits the request to the origin server 130 as a fourth request 205. For example, the proxy server 120 may determine, at operation 4b, that a modified version of the network resource is not stored in the cache and transmit the request 207 to the origin server 130 as a result of this determination. The origin server 130 transmits a fourth response 207 to the proxy server 120. The fourth response 207 includes the requested network resource. The proxy server 120 receives the response 207 and analyzes it. The proxy server 120 determines, at operation 5b, that the network resource includes an advertisement element. In some embodiments, the advertisement element may be code embedded in the body of the network resource. In other embodiments, the advertisement element may be a link to a location where the advertisement element is stored. Upon determining that the network resource includes an advertisement element, the proxy server 120 determines, at operation 6b, that a modified version of the advertisement element is stored in the cache 122. The proxy server 120 retrieves the modified advertisement element from the cache, at operation 7b. At operation 8b, the proxy server 120 generates a modified version of network resource and transmits the third response 203 to the client device. The modified version of the network resource includes the modified advertisement element and is transmitted in the response 203.

The embodiments described herein provide a method and system for optimization of an advertisement in a network resource in a proxy server of a cloud-based proxy service. The solutions presented herein allows the reduction of the weight of an advertisement element on the fly by a proxy service (e.g., proxy server 120). The reduction of the weight of the advertisement element is performed by optimizing the network resource at the markup language layer (e.g., Hypertext Markup Language (HTML)) and optimizing the associated resources and elements included or referred in the network resource. The advertisement element optimization mechanism is performed inline as part of processing performed in a proxy server receiving requests on behalf of an origin server hosting the network resource. As opposed to conventional methods where the origin server may perform some optimization on an advertisement element by modifying the network resource at the application layer, the present mechanisms allow the optimization to be performed on the fly without requiring the intervention of the origin server, which significantly simplifies the optimization operation for the owner/administrator of the origin server. Further, Advertisement elements are created by multiple entities and are delivered by different sources such that the origin server may be required to perform different processing depending on the source and the type of advertisement element as well as being required to retrieve the advertisement elements from different sources. Being able to reduce the weight of the advertisement element on the fly at the proxy server is valuable as it increases performance of the network resource when loaded at a client device without causing a processing burden on the origin server hosting the resource. Further the proxy server can adapt the reduction of the size to the type of element.

Figure 2:
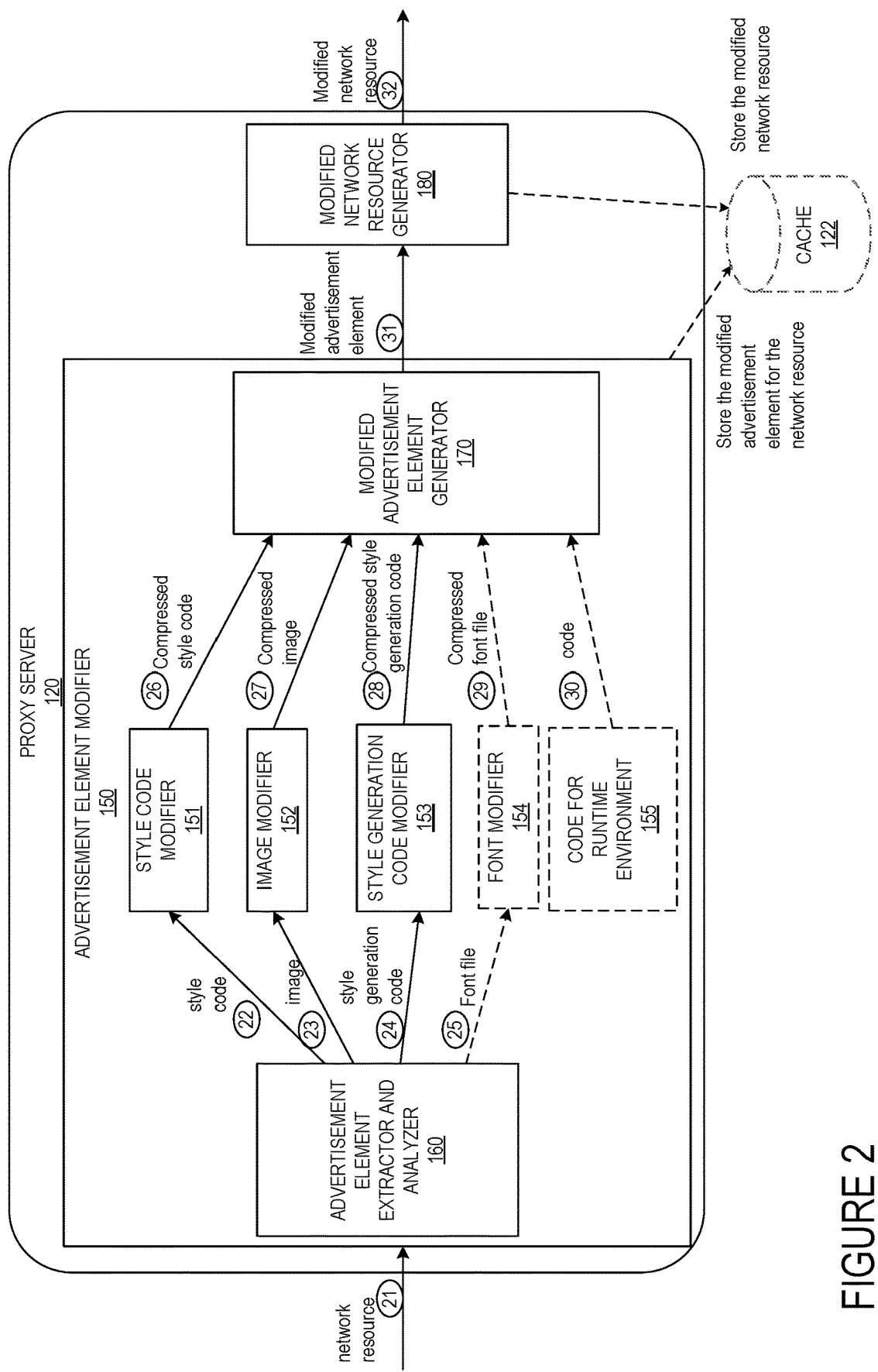
FIG. 2 illustrates a block diagram of an exemplary advertisement element modifier of a proxy server, in accordance with some embodiment.

FIG. 2 illustrates a block diagram of an exemplary advertisement element modifier of a proxy server in accordance with some embodiment. The advertisement element modifier 150 is located in the proxy server 120 and is operative to generate a modified advertisement element of a network resource. The advertisement element modifier 150 includes an advertisement element extractor and analyzer 151, a style code modifier 151, an image modifier 152, a style generation code modifier 153, an optional font modifier 154, and an optional style generation code runtime environment inserter 155, a modified advertisement element generator 170. The proxy server 120 further includes a modified network resource generator 180 in addition to the advertisement element modifier 150.

The advertisement element extractor and analyzer 160 receives the network resource at operation 21 and analyzes the network resource to extract one or more advertisement elements included in the resource. In some embodiments, the advertisement element can be embedded as code in the network resource, in other embodiments, the advertisement element is included as a link indicating the location from which the advertisement is to be retrieved. When the advertisement element is included as a link, the proxy server 120 transmits a request for the advertisement element and received the advertisement element in response to the request.

The advertisement element is analyzed to determine whether it includes style code. In some embodiments, the style code is code written in a style standard such as Cascading Style Sheets (CSS) standard. Responsive to determining that the advertisement element includes style code, the style code 22 is transmitted to the style code modifier 151. The style code modifier 151 is operative to compress the style code into compressed style code 26. In some embodiments, prior to compressing the style code, the style code modifier 151 may remove unused style code from the style code and compress the remaining style code into compressed style code 26. The compressed style code 28 is smaller in size than the style code as originally included in the advertisement element. As described below, in some embodiments, the style code 22 that is included as an external code is replaced with inline code causing a reduction of number of external calls that a client device is to perform when processing the advertisement element.

In one embodiment, the style code included in the advertisement element is an internal style code included in the advertisement element. In this embodiment, the style code modifier 151 compresses the internal style code and includes it as inline style code part of the code forming the advertisement element. For example, when the advertisement element is in an HTML, the style code is included inline in the body of the HTML.

In another embodiment, the style code included in the advertisement element is an external style code and the advertisement element includes a location that allows to retrieve the external style code. In these embodiments, replacing the style code with the compressed style code in the advertisement element includes replacing the external style sheet with a modified external style sheet, where the modified external style sheet includes the compressed style code. In one embodiment, the modified external style sheet is stored on a second proxy server of the cloud-based proxy server and the modified advertisement element includes a location of the external style sheet in the second proxy server of the cloud-based proxy server. In another embodiment, the modified external style sheet can be stored at the original location of the external style sheet and the location of the external style sheet is not modified in the modified advertisement element.

In some embodiments, replacing the style code with the compressed style code includes adding the style sheet as inline style in the body of the modified advertisement element instead of the external style sheet. In some embodiments, the style code can be an external style code (e.g., external CSS) that is retrieved based on the location indicated in the advertisement element and included as the inline style. The proxy server 120 may transmit a request for the style sheet based on the location of the external style sheet indicated in the advertisement element and may receive the style sheet file in response to the request. The style sheet file is then compressed and included as inline style code as part of the body of the advertisement element instead of the external style sheet. In other embodiments, the style code can be an internal style code (e.g., internal CSS) that is compressed and included as inline style code as part of the body of the advertisement element instead of the internal style sheet.

The analyzer 160 determines whether the advertisement element includes one or more images. Responsive to determining that the advertisement element includes an image 23, the image is transmitted to an image modifier 152. The image modifier 152 compresses the image. The compression or optimization of the image can include resizing the original image and replacing this image with the image of smaller size. In one embodiment, the compressed image is stored on a second proxy server of the cloud-based proxy server and the modified advertisement element includes a location of the image in the second proxy server of the cloud -based proxy server. In another embodiment, the compressed image can be stored at the original location of the image and the location of the image is not modified in the modified advertisement element.

In other embodiments, replacing the image with a compressed image in the modified advertisement element includes replacing the image with an encoded string of the image in the advertisement element. For example, the encoded string of the image is a data-Uniform Resource Identifier (data-URI).

While the embodiments discussed herein mention a single image that is modified in an advertisement element, it should be understood that this is exemplary only and the advertisement element may include more than one image. The proxy server 120 may modify all of the images included in the advertisement element or a subset that is less than all of the images present in the advertisement element. Further the modification of multiple images can be different from an image to another. For example, the images can be optimized based on different sizes, depending on the use of the image.

The analyzer 160 determines whether the advertisement element includes style generation code. In some embodiments the style generation code includes JavaScript code. Responsive to determining that the advertisement element includes style generation code 24, the style generation code 24 is transmitted to a style generation code modifier 153. The style generation code modifier 153 compresses the style generation code and outputs compressed style generation code 28. The compressed style generation code 28 is smaller in size than the style generation code as originally included in the advertisement element.

The modified advertisement element generator 170 receives the compressed style code 26, the compressed image 27, the compressed style generation code 28 and generates a modified advertisement element 31. In some embodiment, the advertisement element modifier 150 further stores a copy of the modified advertisement element for the network resource in the cache 122. This modified advertisement element can be retrieved, in some embodiments, when a request for the network resource is later received at the proxy server 120.

In some embodiments, the analyzer 160 further extracts a font file 25 from the advertisement element. The font file 25 is modified by the font modifier 154 to obtain a compressed font file 29. The compressed font file 29 is included in the modified advertisement element 31 instead of the origin font file. In some embodiments, this operation is optional, and the font file is not modified prior to being included in the modified advertisement element 31.

The modified network resource generator 180 generates a modified network resource including the modified version of the advertisement element. The modified network resource 32 is then transmitted by the proxy server 120 to the client device. The modified version of the advertisement element causes the modified network resource to load at the client device 110A faster than the network resource as originally received from the origin server 130. For example, the modified advertisement element includes optimized style code, style generation code, and optimized images such that the processing of these optimized style, style code generation code, and optimized images at the client devices is performed more efficiently than the processing of the origin style code, style generation code, and images. In one example, the inclusion of style code or images as inline elements reduces the number of calls to external locations the client device is required to perform in order to process the advertisement element consequently resulting in a faster and optimal loading of the advertisement element and the network resource. Further the modification of the advertisement element is performed by the proxy server 120 on the fly without requiring any particular additional processing at the origin server.

In some embodiments, the advertisement element modifier 150 is operative to add code for runtime environment. The code enables the proxy server 120 to determine how to best pick resources for the advertisement elements that are more appropriate to the runtime environment of the client device receiving the modified network resource. For instance, the code enables the proxy server to select low resolution images, reduce fidelity of styles, and limit interactivity of the advertisement element when it is determined that the client device is an underpowered mobile device.

In some embodiments, when the advertisement element is not visible upon receipt of a network resource from the origin server 130, the proxy server 120 can pre-fetch resources (e.g., the advertisement element, or portion of the advertisement element such as images, style generation code, style code) so that these resources can be pulled down quicker by the client device when ready. In some embodiments, the proxy server 120 can prefetch the resources and push the resources to the client devices to have them available when needed by the client device. For example, the proxy server 120 may prefect, one or more images, style code, and style generation code that are needed to process the advertisement element at the client devices. In some embodiments, the proxy server 120 pushes these resources to the client device so they are available at the time of processing the advertisement element. The proxy server 120 through the advertisement element modifier 150 may modify these resources prior to pushing them to the client device for processing the advertisement element.

In some embodiments, when the advertisement element has been previously modified and stored in a cache, the optimization of the network resource can be performed by retrieving the modified advertisement element from the cache instead of performing a new modification of the advertisement element. In some embodiments, upon receipt of a request for a network resource, the proxy server 120 analyzes the request and determines at operation that a version of the network resource is stored in the cache 122. The version stored in the cache 122 includes at least one modified advertisement element. For example, the modified version of the network resource may have been stored in the cache 122 after the operations described with reference to FIG. 2 occurred. In this embodiment, the proxy server 120 retrieves the modified network resource including the modified advertisement element from the cache 122 and transmits the response to the client device that requested the network resource. The response includes the modified network resource with the modified advertisement element.

Alternatively, in another embodiment, the proxy server 120 analyzes the request and transmits the request to the origin server 130. For example, the proxy server 120 may determine that a modified version of the network resource is not stored in the cache and transmit the request to the origin server 130 as a result of this determination. The origin server 130 transmits a response to the proxy server 120. The response includes the requested network resource. The proxy server 120 receives the response and analyzes it. The proxy server 120 determines that the network resource includes an advertisement element. Upon determining that the network resource includes an advertisement element, the proxy server 120 determines that a modified version of the advertisement element is stored in the cache 122. The proxy server 120 retrieves the modified advertisement element from the cache and generates a modified version of network resource and transmits modified network resource to the client device. The modified version of the network resource includes the modified advertisement element that was retrieved from the cache. In some embodiments, the modified network resource includes a location of the modified advertisement element as it is stored in a proxy server of the cloud-based proxy service. This proxy server can be proxy server 120 or another proxy server of the service.

While the illustrated embodiments discuss a single advertisement element that is modified, it should be understood that this is exemplary only and the network resource may include more than one advertisement element. The proxy server 120 may modify all of the advertisement elements included in the network resource or a subset that is less than all of the advertisement elements present in the network resource.

The operations in the flow diagrams below will be described with reference to the exemplary embodiments of the FIGS. 1A-2. However, it should be understood that the operations of the flow diagrams can be performed by embodiments of the invention other than those discussed with reference to the other figures, and the embodiments of the invention discussed with reference to FIGS. 1A-2 can perform operations different than those discussed with reference to the flow diagrams.

Figure 3:
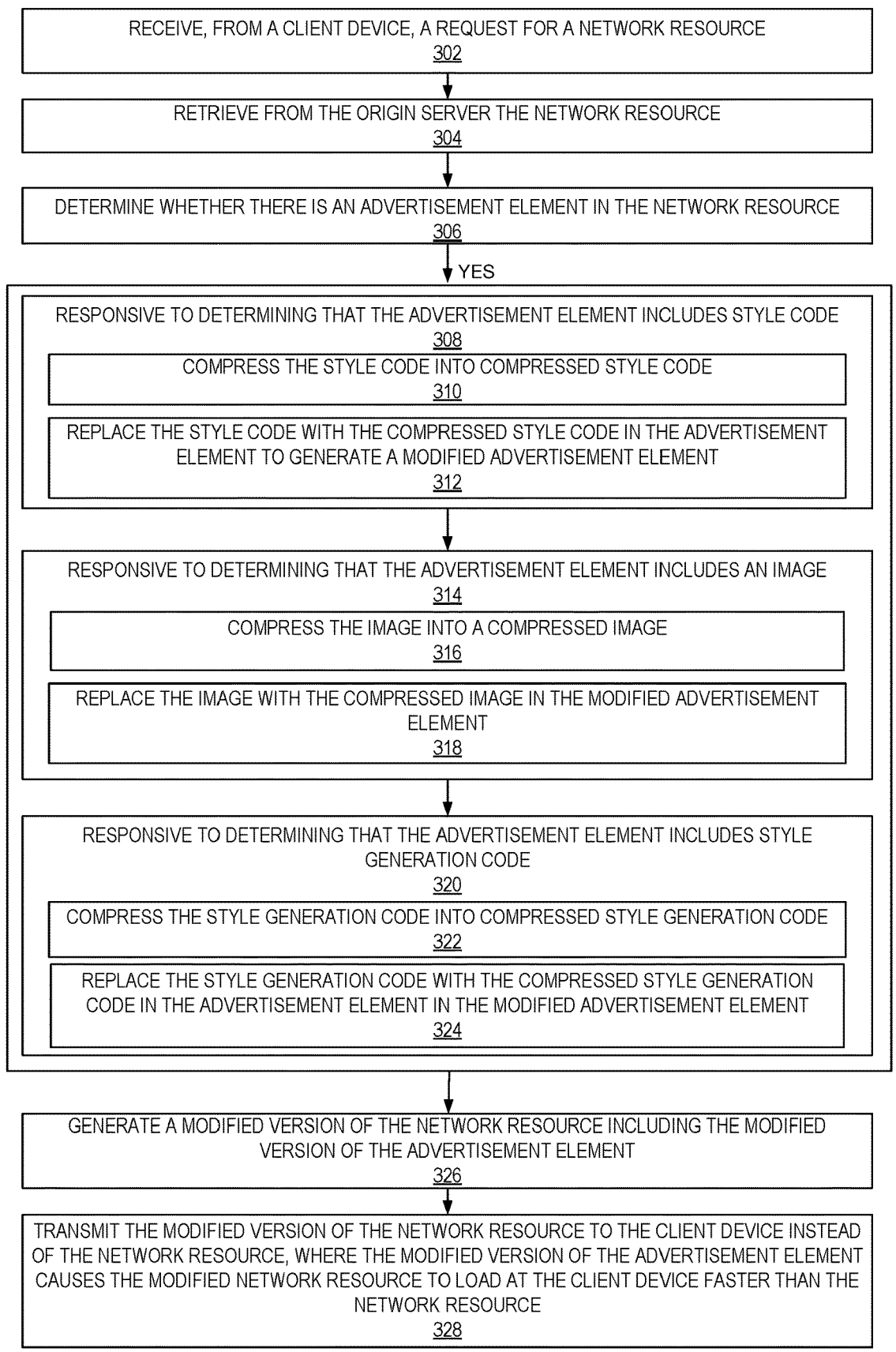
FIG. 3 illustrates a flow diagram of exemplary operations for optimization of an advertisement element in a network resource in a proxy server of a cloud-based proxy service, in accordance with some embodiments.

FIG. 3 illustrates a flow diagram of exemplary operations for optimization of an advertisement element in a network resource in a proxy server of a cloud-based proxy service, in accordance with some embodiments.

At operation 302 the proxy server 120 receives, from a client device (e.g., client device 110A), a request for a network resource. The proxy server 120 retrieves, at operation 304, from the origin server 130 the network resource. For example, the proxy server 120 may transmit a request for the network resource to the origin server 130 and receives in response to the request a response including the network resource.

The flow of operations moves to operation 306, at which the proxy server 120 determines whether the network resource includes an advertisement element. Responsive to determining that the network resource includes an advertisement element, automatically modifying the advertisement element by performing the following operations 308-324.

At operation 308, responsive to determining that the advertisement element includes style code, the proxy server 120 compresses (operation 310) the style code into compressed style code and replaces (operation 312) the style code with the compressed style code in the advertisement element to generate a modified advertisement element. In some embodiments, the compression of the style code and the generation of the modified advertisement element is performed as described in further details with respect to FIG. 2 and the style code modifier 151.

At operation 314, responsive to determining that the advertisement element includes an image, the proxy server 120 compresses (operation 316) the image into a compressed image and replaces the image with the compressed image in the modified advertisement element. In some embodiments, the compression of image and the generation of the modified advertisement element is performed as described in further details with respect to FIG. 2 and the image modifier 152.

At operation 320, responsive to determining that the advertisement element includes style generation code, the proxy server 120 compresses (operation 322) the style generation code into compressed style generation code and replaces (operation 324) the style generation code with the compressed style generation code in the modified advertisement element. In some embodiments, the compression of style generation code and the generation of the modified advertisement element is performed as described in further details with respect to FIG. 2 and the image modifier 153.

In some embodiments, the proxy server 120 modifies a font file to obtain a compressed font file. The compressed font file is included in the modified advertisement element instead of the origin font file. In some embodiments, this operation is optional, and the font file is not modified prior to being included in the modified advertisement element.

The flow of operations then moves to operation 326, at which the proxy server 120 generates a modified version of the network resource including the modified version of the advertisement element. At operation 328, the proxy server 129 transmits the modified version of the network resource to the client device instead of the network resource. The modified version of the advertisement element causes the modified network resource to load at the client device faster than the network resource.

In some embodiments, in addition to modifying the various resources, the proxy server 120 can pre-fetch resources (e.g., the advertisement element, or portion of the advertisement element such as images, style generation code, style code) and cache these resources such that these resources can be pulled down quicker by the client device when ready. In some embodiments, the proxy server 120 can also push the resources to the client devices to have them available when needed at the client device. For example, the proxy server 120 may prefetch, one or more images, style code, and style generation code that are needed to process the advertisement element. The client device may then retrieve these resources from the proxy server 120 when it processes the advertisement element. In some embodiments, the proxy server 120 further pushes these resources to the client device so they are available at the time of processing the advertisement element without requiring that the client device requests these resources. The proxy server 120 through the advertisement element modifier 150 may modify these resources prior to pushing them to the client device. In other embodiments, the proxy server 120 modifies the various resources without storing copies of them locally but instead storing them in their original location or other locations in modified/optimized versions so they are available in this optimized version when the client device is to process the advertisement element.

The various embodiments described herein causes the client device to improve the performance of execution of the advertisement element and speed up the loading of the network resource and the advertisement element at the network resource without requiring any additional processing burden on the origin server hosting the network resource nor on the servers hosting the advertisement element. This process of optimization and modification of the advertisement elements of a network resource is performed on the fly by the proxy server.

Figure 4:
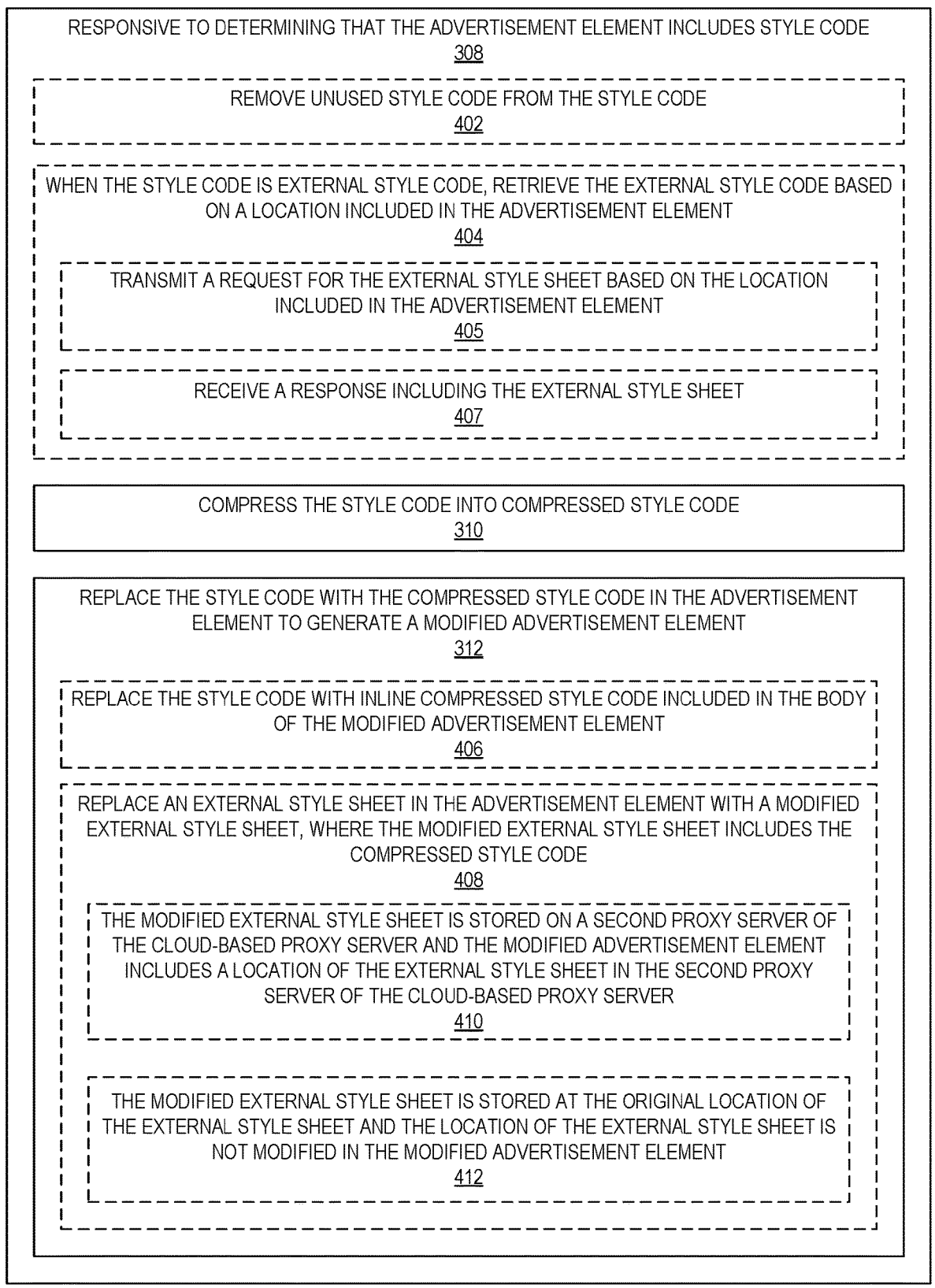
FIG. 4 illustrates a flow diagram of exemplary operations for replacing style code with compressed style code in the modified advertisement element, in accordance with some embodiments.

FIG. 4 illustrates a flow diagram of exemplary operations for replacing style code with compressed style code in the modified advertisement element, in accordance with some embodiments. In some embodiments, the style code is code written in a style standard such as Cascading Style Sheets (CSS) standard. Responsive to determining that the advertisement element includes style code, the proxy server 120 performs the operations 310, 312, and optional operation 402. At operation 310, the proxy server 120 compresses the style code of the advertisement element into compressed style code. In some embodiments, prior to compressing the style code, the proxy server 120 may remove (operation 402) unused style code from the style code and compress the remaining style code into compressed style code. The compressed style code is smaller in size than the style code as originally included in the advertisement element.

In some embodiments, the replacement of the style code with compressed style code includes replacing (operation 406) the style code with inline compressed style coded included in the body of the modified advertisement element. In one example, when the style code included in the advertisement element is an internal style code included in the advertisement element, the proxy server 120 compresses the internal style code and includes it as inline style code part of the code forming the advertisement element. For example, when the advertisement element is in an HTML, the style code is included inline in the body of the HTML. In another example, when the style code included in the advertisement element is an external style code indicated with a location in the advertisement element, the proxy server 120 retrieves (operation 404) the external style code, compresses the external style code (operation 310) and includes it as inline style code part of the code forming the advertisement element. For example, when the advertisement element is in an HTML, the style code is included inline in the body of the HTML. In some embodiments, the style code can be an external style code (e.g., external CSS) that is retrieved (operation 404) based on the location indicated in the advertisement element and included as the inline style. The proxy server 120 may transmit a request (operation 407) for the style sheet based on the location of the external style sheet indicated in the advertisement element and may receive (operation 407) the style sheet file in response to the request. The style sheet file is then compressed and included as inline style code as part of the body of the advertisement element instead of the external style sheet. In other embodiments, the style code can be an internal style code (e.g., internal CSS) that is compressed and included as inline style code as part of the body of the advertisement element instead of the internal style sheet.

In some embodiments, the style code included in the advertisement element is an external style code and the advertisement element includes a location that allows to retrieve the external style code. In these embodiments, replacing the style code with the compressed style code in the advertisement element includes replacing (operation 408) the external style sheet with a modified external style sheet, where the modified external style sheet includes the compressed style code. In one embodiment, the modified external style sheet is stored (operation 410) on a second proxy server of the cloud-based proxy server and the modified advertisement element includes a location of the external style sheet in the second proxy server of the cloud-based proxy server. In another embodiment, the modified external style sheet can (operation 412) be stored at the original location of the external style sheet and the location of the external style sheet is not modified in the modified advertisement element. In another embodiment, the modified external style sheet can be stored at any other location and the advertisement element is modified accordingly to indicate this modified location for the modified style sheet. The modified style sheet is smaller in size and is an optimized version of the style sheet originally included in the advertisement element. In some embodiments, replacing the external style sheet with the compressed style code includes (as shown in operation 406) adding the style sheet as inline style in the body of the modified advertisement element instead of the external style sheet.

FIG. 5 illustrates a flow diagram of exemplary operations for replacing an image with a compressed image in the modified advertisement element, in accordance with some embodiments. Responsive to determining that the advertisement element includes an image, the proxy server 120 compresses the image. The compression or optimization of the image can include resizing the original image and replacing this image with the image of smaller size (operation 506). In one embodiment, the compressed image is stored on a second proxy server of the cloud-based proxy server and the modified advertisement element includes a location of the image in the second proxy server of the cloud-based proxy server. In another embodiment, the compressed image can be stored at the original location of the image and the location of the image is not modified in the modified advertisement element.

In other embodiments, replacing the image with a compressed image in the modified advertisement element includes replacing (operation 502) the image with an encoded string of the image in the advertisement element. For example, the encoded string (504) of the image is a data-Uniform Resource Identifier (data-URI). The embodiments described above present methods and systems for optimization of an advertisement in a network resource in a proxy server of a cloud-based proxy service. The solutions presented herein allows the reduction of the weight of an advertisement element on the fly by a proxy service (e.g., proxy server 120) and present several advantages when compared to existing optimization solutions. The reduction of the weight of the advertisement element is performed by optimizing the network resource at the markup language layer (e.g., Hypertext Markup Language (HTML)) and optimizing the associated resources and elements included or referred in the network resource. The advertisement element optimization mechanism is performed inline as part of processing performed in a proxy server receiving requests on behalf of an origin server hosting the network resource. As opposed to conventional techniques where the origin server may perform some optimization on an advertisement element by modifying the network resource at the application layer, the present mechanisms allow the optimization to be performed on the fly without requiring the intervention of the origin server, which significantly simplifies the optimization operation for the owner/administrator of the origin server. Further, Advertisement elements are created by multiple entities and are delivered by different sources such that the origin server may be required to perform different processing depending on the source and the type of advertisement element as well as being required to retrieve the advertisement elements from different sources. Being able to reduce the weight of the advertisement element on the fly at the proxy server is valuable as it increases performance of the network resource when loaded at a client device without causing a processing burden on the origin server hosting the resource. Further the proxy server can adapt the reduction of the size to the type of element.

Figure 6:
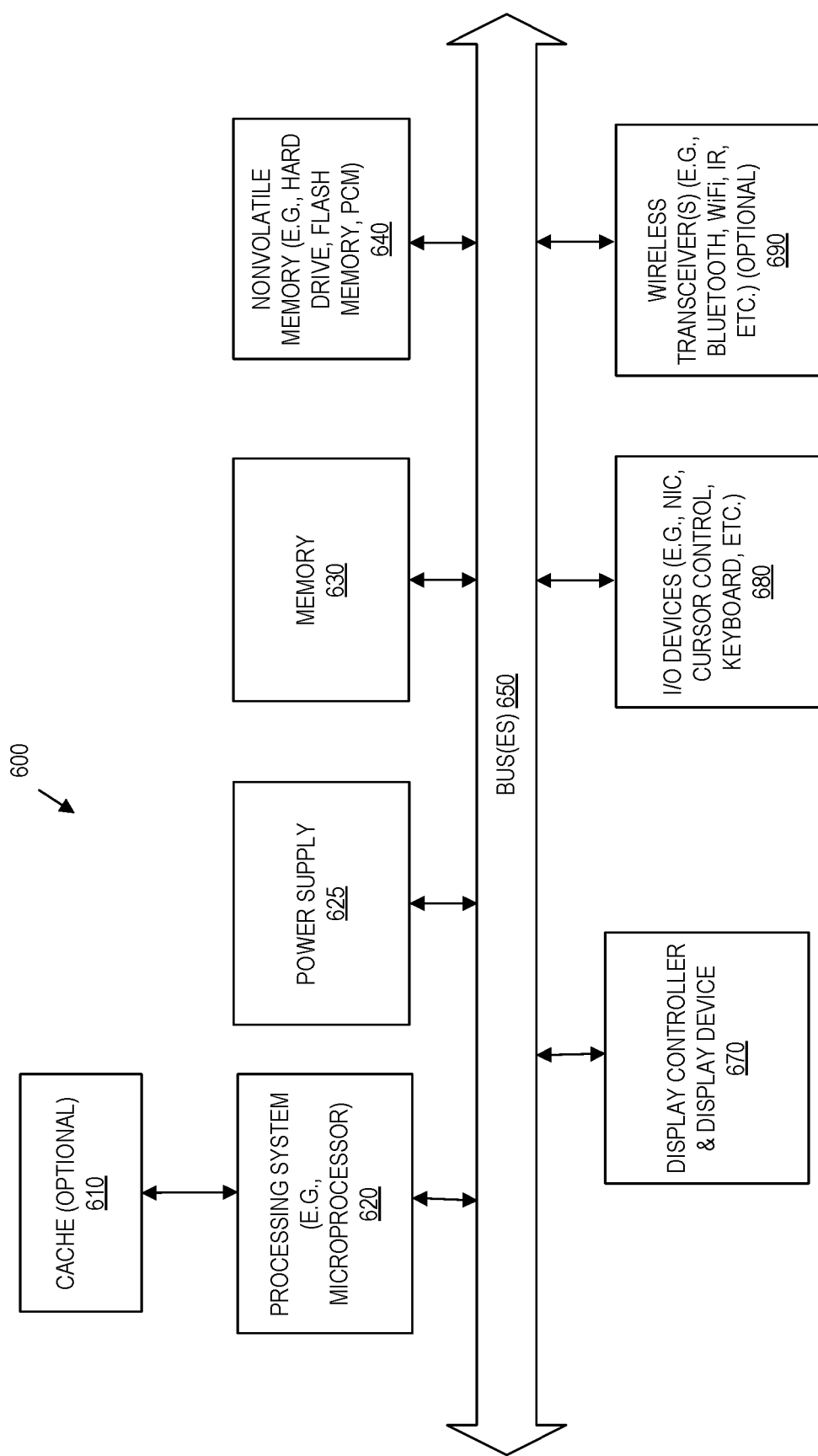
FIG. 6 illustrates a block diagram of an exemplary computer system that can be used for dynamically optimizing a script library in accordance with some embodiments.

FIG. 6 illustrates a block diagram of an exemplary computer system that can be used for dynamically optimizing an advertisement element of a network resource in accordance with some embodiments. The computer system 600, which is an electronic device, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client devices 110A-B, the proxy server 120, the service server 125, and/or the origin server 130 can take the form of the computer system 600 and perform the operations described with reference to FIGS. 1A-5.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server of a cloud-based proxy service of optimization of an advertisement element in a network resource, the method comprising:
   receiving, from a client device, a HyperText Transfer Protocol (HTTP) request for a network resource;
   retrieving from an origin server the network resource;
   determining whether the network resource includes an advertisement element,
      wherein the advertisement element includes code that includes at least style code, an image, and style generation code;
   responsive to determining that the network resource includes an advertisement element, automatically modifying the advertisement element by performing the following:
      responsive to determining that the advertisement element includes the style code, performing the following:
         compressing the style code into compressed style code, and
         replacing the style code with the compressed style code in the advertisement element to generate a modified advertisement element,
      responsive to determining that the advertisement element includes the image, performing the following:
         compressing the image into a compressed image, and replacing the image with the compressed image in the modified advertisement element,
responsive to determining that the advertisement element includes the style generation code, performing the following:
compressing the style generation code into compressed style generation code, and
replacing the style generation code with the compressed style generation code in the modified advertisement element,
generating a modified version of the network resource including the modified advertisement element; and
transmitting, in an HTTP response, the modified version of the network resource to the client device instead of the network resource, wherein the modified advertisement element causes the modified version of the network resource to load at the client device faster than the network resource.

2. The method of claim 1, wherein replacing the style code with the compressed style code in the advertisement element to generate the modified advertisement element includes replacing an external style sheet in the advertisement element with a modified external style sheet, wherein the modified external style sheet includes the compressed style code.

3. The method of claim 2, wherein the modified external style sheet is stored on a second proxy server of the cloud-based proxy service and the modified advertisement element includes a location of the external style sheet in the second proxy server of the cloud-based proxy service.

4. The method of claim 1, wherein replacing the style code with the compressed style code in the advertisement element to generate the modified advertisement element includes replacing the style code with inline compressed style code included in the body of the modified advertisement element.

5. The method of claim 1, wherein replacing the image with the compressed image in the modified advertisement element includes replacing the image with an encoded string of the image in the advertisement element.

6. The method of claim 5, wherein the encoded string of the image is a data-Uniform Resource Identifier (URI).

7. The method of claim 1, wherein automatically modifying the advertisement element further includes compressing fonts of the advertisement element.

8. A proxy server of a cloud-based proxy service for optimization of an advertisement element in a network resource, the proxy server comprising:
one or more processors; and
a non-transitory computer readable storage medium that stores code, which when executed by the one or more processors causes the proxy server to perform the following operations:
receiving, from a client device, a HyperText Transfer Protocol (HTTP) request for a network resource;
retrieving from an origin server the network resource;
determining whether the network resource includes an advertisement element,
wherein the advertisement element includes code that includes at least style code, an image, and style generation code;
responsive to determining that the network resource includes an advertisement element, automatically modifying the advertisement element by performing the following:
responsive to determining that the advertisement element includes the style code, performing the following:
compressing the style code into compressed style code, and
replacing the style code with the compressed style code in the advertisement element to generate a modified advertisement element,
responsive to determining that the advertisement element includes the image, performing the following:
compressing the image into a compressed image, and
replacing the image with the compressed image in the modified advertisement element,
responsive to determining that the advertisement element includes the style generation code, performing the following:
compressing the style generation code into compressed style generation code, and
replacing the style generation code with the compressed style generation code in the modified advertisement element,
generating a modified version of the network resource including the modified advertisement element; and
transmitting, in an HTTP response, the modified version of the network resource to the client device instead of the network resource, wherein the modified advertisement element causes the modified version of the network resource to load at the client device faster than the network resource.

9. The proxy server of claim 8, wherein replacing the style code with the compressed style code in the advertisement element to generate the modified advertisement element includes replacing an external style sheet in the advertisement element with a modified external style sheet, wherein the modified external style sheet includes the compressed style code.

10. The proxy server of claim 9, wherein the modified external style sheet is stored on a second proxy server of the cloud-based proxy service and the modified advertisement element includes a location of the external style sheet in the second proxy server of the cloud-based proxy service.

11. The proxy server of claim 8, wherein replacing the style code with the compressed style code in the advertisement element to generate the modified advertisement element includes replacing the style code with inline compressed style code included in the body of the modified advertisement element.

12. The proxy server of claim 8, wherein replacing the image with the compressed image in the modified advertisement element includes replacing the image with an encoded string of the image in the advertisement element.

13. The proxy server of claim 12, wherein the encoded string of the image is a data-Uniform Resource Identifier (URI).

14. The proxy server of claim 8, wherein automatically modifying the advertisement element further includes compressing fonts of the advertisement element.

15. A non-transitory computer readable storage medium that stores instructions which when executed by one or more processors of a proxy server of a cloud-based proxy service cause said processors to perform the following operations for optimization of an advertisement element in a network resource, the operations comprising:
receiving, from a client device, a HyperText Transfer Protocol (HTTP) request for a network resource;

retrieving from an origin server the network resource;
determining whether the network resource includes an advertisement element,
   wherein the advertisement element includes code that includes at least style code, an image, and style generation code;
responsive to determining that the network resource includes an advertisement element, automatically modifying the advertisement element by performing the following:
   responsive to determining that the advertisement element includes the style code, performing the following:
      compressing the style code into compressed style code, and
      replacing the style code with the compressed style code in the advertisement element to generate a modified advertisement element,
   responsive to determining that the advertisement element includes the image, performing the following:
      compressing the image into a compressed image, and
      replacing the image with the compressed image in the modified advertisement element,
   responsive to determining that the advertisement element includes the style generation code, performing the following:
      compressing the style generation code into compressed style generation code, and
      replacing the style generation code with the compressed style generation code in the modified advertisement element,
generating a modified version of the network resource including the modified advertisement element; and
transmitting, in an HTTP response, the modified version of the network resource to the client device instead of the network resource, wherein the modified advertisement element causes the modified version of the network resource to load at the client device faster than the network resource.

16. The non-transitory computer readable storage medium of claim 15, wherein replacing the style code with the compressed style code in the advertisement element to generate the modified advertisement element includes replacing an external style sheet in the advertisement element with a modified external style sheet, wherein the modified external style sheet includes the compressed style code.

17. The non-transitory computer readable storage medium of claim 16, wherein the modified external style sheet is stored on a second proxy server of the cloud-based proxy service and the modified advertisement element includes a location of the external style sheet in the second proxy server of the cloud-based proxy service.

18. The non-transitory computer readable storage medium of claim 15, wherein replacing the style code with the compressed style code in the advertisement element to generate the modified advertisement element includes replacing the style code with inline compressed style code included in the body of the modified advertisement element.

19. The non-transitory computer readable storage medium of claim 15, wherein replacing the image with the compressed image in the modified advertisement element includes replacing the image with an encoded string of the image in the advertisement element.

20. The non-transitory computer readable storage medium of claim 19, wherein the encoded string of the image is a data-Uniform Resource Identifier (URI).

21. The non-transitory computer readable storage medium of claim 15, wherein automatically modifying the advertisement element further includes compressing fonts of the advertisement element.

* * * * *